July 12, 1966  E. G. STACK  3,260,546
CHOKER HOOK
Filed March 30, 1964  2 Sheets-Sheet 1
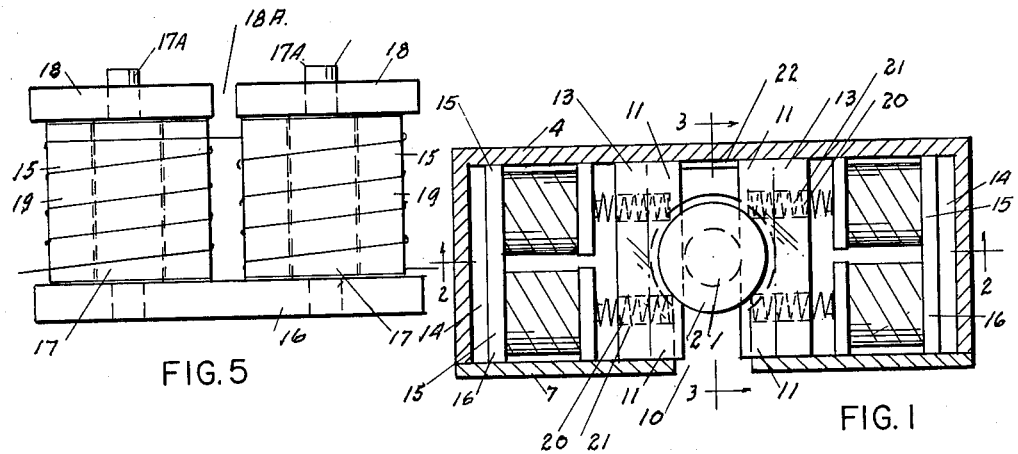
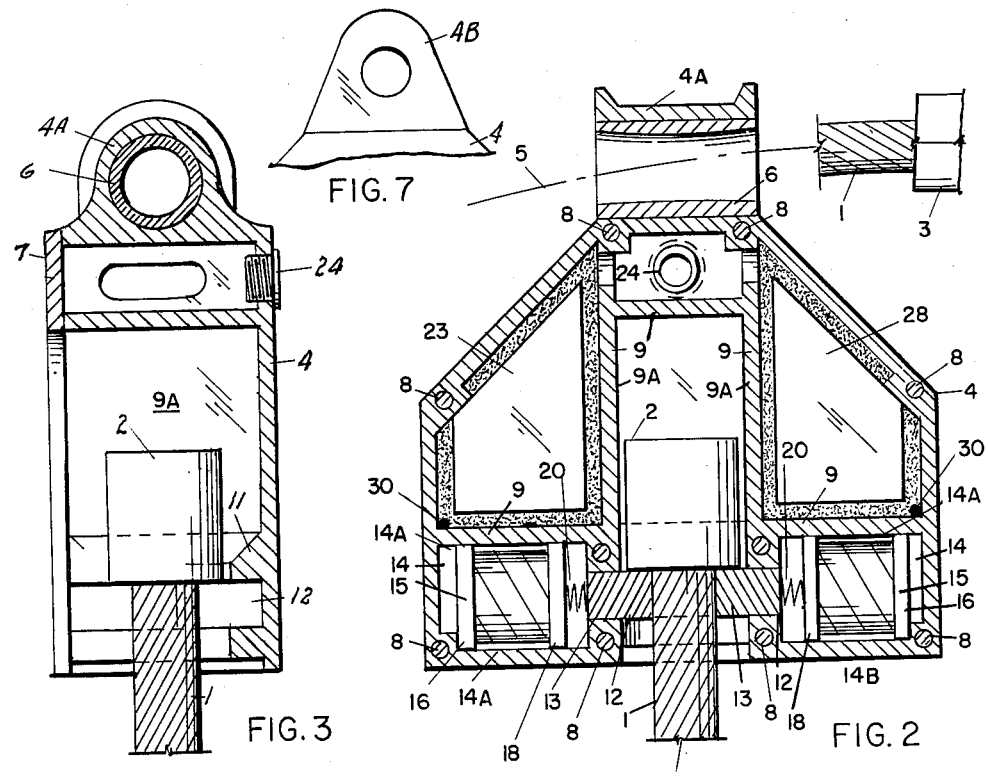
Emmet G. Stack
Inventor July 12, 1966  E. G. STACK  3,260,546
CHOKER HOOK Filed March 30, 1964

Emmet G. Stack
Inventor 3,260,546
CHOKER HOOK
Emmet G. Stack, 1000 SW. Vista, Portland, Oreg.
Filed Mar. 30, 1964, Ser. No. 355,840
7 Claims. (Cl. 294—75)

My invention relates to a choker hook in which the ferrule on the choker may be released through the bottom of the choker hook by remote control.

The principal object of my invention is to provide the smallest, lightest, choker hook that is practical in the logging industry employing the above characteristics.

Another objective is to be able to unhook a choker without making the operation a manual one.

Another objective is to be able to unhook a choker through the agency of a radio frequency oscillator signal to an electronic relay in a receiver carried by the choker hook.

Another objective is to be able to release the ferrule through a bottom opening in the choker hook.

A further objective is to provide means for supporting the choker ferrule within the hook which includes a pair of oppositely disposed chocks adapted to be withdrawn from beneath the ferrule to permit the ferrule to drop through or be pulled through the bottom of the choker hook.

I am familiar with Patent 3,104,909 issued to William M. Walker and of his continuation-in-part application Ser. No. 300,021, now Patent No. 3,154,337. The patent and the application portray different species of Mr. Walker's basis idea.

Applicant presents a different species not found among the species presented by Mr. Walker, namely, that the chocks beneath the ferrule do not have to move so far to free the ferrule. This lesser movement makes it practical to use an electro-magnet with the limited low voltage current available in a choker hook. The use of a magnet permits the choker hook to be much smaller-as much as four inches over the solenoid type shown in Walker's application Ser. No. 300,021, now Patent No. 3,154,337. The use of the magnet makes the hook more compact and makes it feasible to use one of the alloys of aluminum instead of manganese steel at one third the weight. Cutting down size and weight without cutting down efficiency is the principal objective of this application.

How this is brought about is illustrated in the accompanying drawings in which:

FIG. 1 is a horizontal cross section of the choker hook showing the ferrule, chocks, and magnets.

FIG. 2 is a vertical section on the line 2—2 of FIG. 1.

FIG. 3 is a vertical section on the line 3—3 of FIG. 1.

FIG. 5 is a plan view of the magnet.

FIG. 7 shows an eye support for the choker hook.

Throughout the drawings and the specification similar numerals refer to similar parts.

Figure 4:
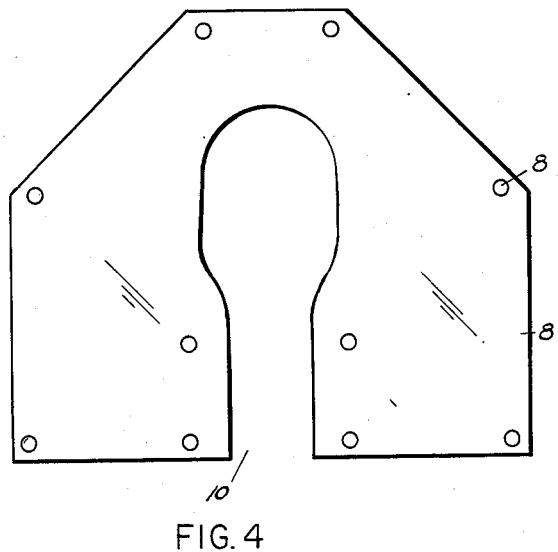
FIG. 4 is a plan view of the cover plate.

FIGS. 1, 2, and 3, show the choker 1 having a ferrule 2 socketed on one end thereof, and FIG. 2 shows a ferrule 3 socketed on the opposite end of said choker 1 after it has been passed through the cored portion 4A of the choker casing 4 to form a loop 5 to encircle a log (not shown). Chokers of plough steel wire rope range in diameter from ¾" to 1¼" and of a length to handle timber being logged. How the ferrules 2 and 3 are socketed on the choker 1 is too well known in the logging industry to require a detailed description herein.

It may be pointed out that the choker casing may vary in size and configuration and the cored portion 4A may be superseded with an eye 4B (see FIG. 7) when the choker hook is used for other purposes. When the choker casing is made of aluminum alloy I prefer to provide the steel bushing 6.

The choker casing 4 is provided with a cover plate 7 secured to said casing 4 by the screws 8. The choker casing 4 is compartmented to seal off the elements therein and to keep dirt and water from reaching them. The horizontal and vertical compartment members 9 are finished as shown in FIGS. 1 and 3 to form a tight seal between them and the cover plate 7. A gasket (not shown) may be used to improve the seal. All compartments may be entered from the cover plate side for finishing or for the installation of elements therein.

The ferrule 2 is entered within the choker casing 4 through the T-shaped opening 10 in the cover plate 7. FIGS. 1, 2, and 3, show, by broken lines, the centering members 11 for the ferrule 2 protruding from the face 9A of the members 9 adjacent the ferrule 2. The vertical members 9 adjacent the ferrule 2 are finished to provide the slot 12 for the reception of the chocks 13 which are a snug sliding fit within said slot 12. Each slot 12 connects with a compartment 14 whose top, and bottom faces 14A and 14B are finished for the reception therebetween of members of the magnets 15 oppositely disposed. Each magnet 15 comprises a back member 16 into which is press-fitted the shouldered cores 17 in spaced apart relation. A pole piece 18 is press-fitted on the opposite end of the core 17 as to leave an air gap 18A between the two core pieces. Before the core pieces are put in place the coils 19 are positioned on the cores 17 as shown in FIG. 5.

The coils 19 are wound of insulated wire of a size to move the chocks 13, which serve as the armatures of the magnets 15, with the power at hand. The shouldered end 17A projects beyond the pole piece 18 for the reception of one end of a coil compression spring 20 whose other end is positioned within the core 21 formed in the chock or armature 13.

The chock or armature 13 consists of a length of key stock having its face adjacent the ferrule, which rests upon it, case hardened. Under the action of the coil spring 20 the chock or armature 13 comes to rest against the choker 1 beneatth the ferrule 2 when the power is off. See FIG. 2.

To prevent the coil springs 20 from moving their respective chocks or armatures 13 beyond the edge of the T-shaped slot 10 I provide the stop means 22 which, in this instance, is cast integral with the choker casing 4 and has a length equal to the diameter of the choker 1.

Many types of iron and steel have been used for magnets but where only a limited amount of low voltage current is available one had better consult a supplier of magnet material and get the best and then do a good job.

Figure 6:
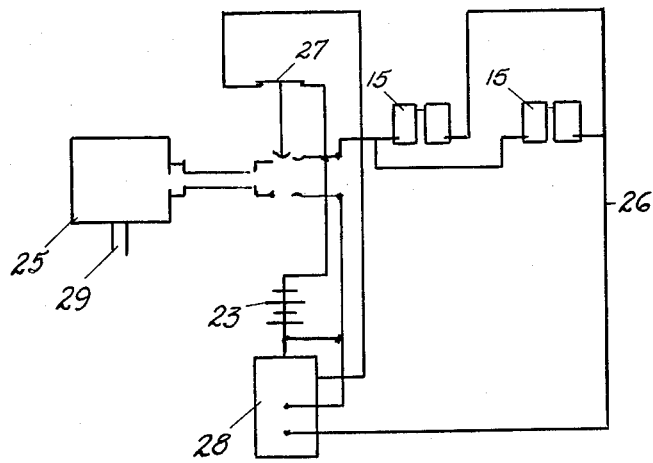
FIG. 6 is a plan view of the electric circuit for operating the magnets.

The electric current to supply the magnets 15 is furnished by the battery 23 which is of the nickel-cadmium type rechargeable when needed. A receptacle 24 adapted to be connected with the charger 25 is carried by the choker hook casing 4. FIG. 6 shows a diagram of the electric circuit 26 in which are shown the two magnets 15, the battery 23, the switch 27, and the electronic relay receiver 28. When the battery charger 25 is connected to a source of A.C. current as 29 and to the receptacle 24, the switch 27 is opened removing current from the electronic relay in the receiver 28 and permitting said current to flow into the battery 23. When not being charged, current from the battery 23 flows through the switch 27 and then back to energize hte electronic relay in the receiver 28. The "CAT" operator or one of the workman carries a remote control oscillator (not shown). This is a small transistorized radio-frequency oscillator operating in the citizens band. When a push button is depressed on the oscillator, current flows from a self-contained battery to a crystal and transistor permitting a signal to be transmitted. When the electronic relay in the receiver 28 receives a signal from the remote oscillator, contacts close which permits current to flow to the magnets 15.

The antenna 30 for the receiver 28 is shown as an open loop of insulated wire positioned within the choker hook casing 4 but, like other commercial elements, may be of other suitable form for a particular choker hook.

It is to be noted that the battery 23, the battery charger 25, the switch 27, and even the oscillator (not shown), are commercially available and hence have not been minutely described.

It is also to be noted that the "CAT" operator is usually present when a choker 1 is being applied to the log and has control of the oscillator to spread the chocks 13 so that the ferrule 2 may be entered within the choker casing 4. When the ferrule 2 is within the choker casing 4, the chocks 13 are automatically brought into contact with the choker 1 beneath the ferrule 2 as shown in FIG. 2.

When logs are being dragged through water or into water I prefer to chrome plate the top and bottom surfaces of the chocks or armatures. In this instance I also prefer to use brass compression springs.

The battery and receiver should be well anchored and insulated as shown in FIG. 2.

Through the use of electro-magnets and straight bar chocks, or armatures I have been able to compact my choker hook so as to be able to use an aluminum alloy for the hook and thus make it smaller and lighter and thus practical.

Most of the timbered country west of the Rockies is rough and most of the species is large—up to 10′ in the Redwoods and up to 6′ in the Douglas Fir regions. Regardless of the timber being logged and the system employed chokers and choker hooks are used. It takes strong and heavy rigging to haul out a 6′ x 40′ Fir log. The choker and hook to handle this log must be dragged up rough and steep grades by the rigging crew. Every ounce in weight count by the end of the day and crews get particular with the equipment used.

It is obvious that with the limited power at hand in the choker hook, the chocks could not be withdrawn from beneath the ferrule when the ferrule is resting upon said chocks. However, it is pointed out that if the ferrule is raised only the thickness of a place of paper the chock would be free. In most instances there is a back lash, so to speak, when a load is dropped, sometimes it is necessary to drop a load several times before the back lash is obtained and the ferrule lifted off the chocks or armatures.

I do not limit my invnetion to the exact disclosures but extend it to all that comes fairly within the scope of the appended claims.

What I claim as new over the art follows.
I claim:
1. In a logging device which includes in combination:
  (1) a length of material-supporting wire rope having a ferrule on one end thereof;
  (2) a choker hook having a hollow casing formed with an open side, a top-supporting means, and a bottom opening through which the ferrule can pass;
  (3) a cover plate for said open side having a T-shape opening therethrough for the entry of the ferrule into the casing;
  (4) a pair of oppositely disposed chocks positioned above the bottom opening for the support of the ferrule, each chock being adapted to serve as the armature of an electro-magnet;
  (5) an electro-magnet for each chock adapted when energized to withdraw said chock from beneath the ferrule when the chock is free, each electro-magnet including a back member, spaced apart core members projecting from said back member and having free ends, a coil encircling each core member, a pole piece on the free end of each core member, said pole pieces being spaced apart to form an air gap between them;
  (6) means to energize the electromagnets which includes a battery, a radio frequency oscillator and an electronic relay in a receiver, said relay being operable upon a signal from the oscillator to control the flow of current from the battery to the electro-magnets;
  (7) and a spring interposed between each electro-magnet pole piece and the adjacent armature adapted to move the opposed armatures toward each other when current to the electro-magnets is cut off.

2. The structure of claim 1 in which a stop means is incorporated in the choker casing to limit the return movement of the armatures by the springs.

3. The structure of claim 1 in which ferrule centering means are incorporated in the choker casing.

4. The structure of claim 1 in which the armatures are of uniform cross section through out their length.

5. The structure of claim 1 in which the choker casing is made of an aluminum alloy and the chocks of magnetizable material.

6. The structure of claim 1 in which the support for the chocks is cantilevered from the three sides of the choker casing.

7. A logging device which includes in combination:
  (1) a choker having a ferrule socketed on both ends thereof;
  (2) a choker hook having a hollow casing formed with a top opening therethrough for the passage of the choker, an open side, and a bottom opening through which the ferrule can pass;
  (3) a cover plate for said open side having a T-shaped opening therethrough for the entry of the ferrule into the casing;
  (4) a pair of oppositely disposed chocks positioned above the bottom opening for the support of the ferrule, each chock being adapted to serve as the armature of an electro-magnet;
  (5) an electro-magnet for each chock adapted when energized to withdraw said chocks from beneath the ferrule when the chock is free, each electro-magnet including a back member, spaced apart core members projecting from said back member and having free ends, a coil encircling each core member, a pole piece on the free end of each core member, said pole pieces being spaced apart to form an air gap between them;
  (6) means to energize the electromagnets which includes a battery, a radio frequency oscillator and an electronic relay in a receiver, said relay being operable upon a signal from the oscillator to control the flow of current from the battery to the electro-magnets;
  (7) and a spring interposed between each electro-magnet pole piece and the adjacent armature adapted to move the opposed armatures toward each other when current to the electro-magnets is cut off.

References Cited by the Examiner

UNITED STATES PATENTS

| | | | |
|---|---|---|---|
| 827,080 | 7/1906 | Clukies | 294—88 X |
| 3,104,909 | 9/1963 | Walker | 294—75 |
| 3,154,337 | 10/1964 | Walker | 294—78 |

GERALD M. FORLENZA, *Primary Examiner.*
ERNEST A. FALLER, SAMUEL F. COLEMAN, *Examiners.*
G. F. ABRAHAM, *Assistant Examiner.*